April 6, 1965   R. L. ALDER ETAL   3,176,407
DRIFT INDICATOR
Filed March 11, 1960   5 Sheets-Sheet 4

INVENTORS:
Robert Lee Alder
Paul J. Arnerich

Attorney

United States Patent Office 3,176,407
Patented Apr. 6, 1965

3,176,407
DRIFT INDICATOR
Robert Lee Alder, La Canada, and Paul J. Arnerich, Pasadena, Calif., assignors to Varney Engineering Corporation, El Segundo, Calif., a corporation of California
Filed Mar. 11, 1960, Ser. No. 14,311
27 Claims. (Cl. 33—205)

This invention relates to a signalling device for use in drilling a well bore to indicate deviations of the well bore from vertical. The invention is of the general character disclosed in the Varney Patents 2,329,732; 2,435,934; and 2,762,132, which disclosures are hereby incorporated in the present disclosure by reference.

The deviation signals are produced by periodically restricting the flow of the drilling fluid to create a succession of pulses of pressure in the drilling stream, the number of pulses varying in accord with the degree of deviation. The pressure pulses may be readily detected and, of course, may be amplified if desired.

The device typically comprises a liquid-filled instrument casing or housing and a plunger that tends to be extended longitudinally upward from the housing by spring action. The plunger has a head or enlargement that traverses a series of annular restrictions in the drill pipe to produce the series of signals. The instrument housing has a movable wall, for example a diaphragm, which permits displacement of the confined instrument liquid so that the combined volume of the housing and the exposed portion of the plunger remains constant throughout the operation of the device.

When the downward flow of drilling fluid is stopped, the plunger extends along the series of restrictions to whatever degree is permitted by a pendulum which moves along a series of graduated stop shoulders. When the flow of drilling fluid is resumed the force of the stream against the plunger head drives the plunger slowly back to its normal retracted position with consequent creation of the deviation signals in accord with the stopped position of the plunger.

Heretofore the number of signals has decreased with increasing deviations from vertical because the pendulum moves upward past a series of annular shoulders that are necessarily of progressively decreased diameter. The nearer to vertical the instrument housing, the greater the upward travel of the pendulum together with the plunger that is controlled by the pendulum.

One important object of the present invention is to reverse this situation to cause the number of signals to vary directly as the deviation of the bore hole from vertical. This reversal lessens the burden of interpreting the signals in terms of deviation. In the presently preferred embodiment of the invention, for example, each of the successive stop shoulders for the pendulum represents one-half degree of deviation from vertical. To find the actual number of degrees of deviation of the bore hole from vertical, the operator merely mentally divides the number of signals by two.

Heretofore the instrument housing has been dimensioned to fit into a conventional drill collar or sub. It is now contemplated that the instrument housing will be increased in diameter and mounted in a special sub that is, of course, of the same outside diameter as a conventional sub. This change is desirable to increase the size of passage through which the drilling fluid may flow past the instrument in a drill string of a given nominal diameter. The special sub should be relatively short for a number of reasons and especially because of the cost of fabricating such a special sub. A second object of the invention, therefore, is to shorten the length of instrument case without, however, shortening the range of the signal-creating movement of the plunger.

A third object of the present invention is to avoid an excessive tension load on the pendulum. It has been found that in constructions heretofore used the pendulum mechanism may be subjected to excessive strain when violent reverse flow of the drilling fluid is experienced during the lowering of the drill string in the bore hole. The reverse flow subjects the plunger to excessive extension force which is transmitted to the pendulum.

A fourth object of the invention is to minimize the "down" time required to derive a deviation measurement. To take time out just to stop the mud pumps and to stop the rotation of the bit to permit the spring-actuated extension of the instrument plunger in preparation for deriving the measurement involves an undesirable reduction of the productive drilling time. In many instances, moreover, the formation that is being drilled is such that it may slump into the bore hole, with consequent danger of sticking the drill string, when the mud pumps are stopped and at the same time rotation of the drill string is stopped. Such a condition is necessarily risked periodically for the purpose of adding a length of drill pipe to the string but drillers are reluctant to prolong the risk for the sole purpose of obtaining a deviation reading. Heretofore the added "down" time required for operation of the deviation detector has been approximately two minutes. The present invention reduces the additional "down" time to a period on the order of 15 seconds or less whenever a length of drill pipe is added.

These four objects of the invention are made possible by a new arrangement for operatively relating the pendulum to the signal-creating plunger. Heretofore the pendulum has been directly connected to the plunger. A basic feature of the preferred practice of the present invention is that the pendulum is structurally separate from the plunger and controls a series of stop elements which, in turn, limit the extension movement of the plunger.

In the present embodiment of the invention, what may be termed a stationary stop tube telescopes into the lower or inner end of the signal-creating plunger and provides a series of spaced stop elements which cooperate selectively with an inner annular stop shoulder of the plunger. The pendulum is connected to what may be termed a coding rod which slidingly telescopes into the fixed stop tube. In response to the movement of the pendulum that terminates in accord with the deviation of the bore hole, the coding rod shifts in the stop tube to make the stop elements effective selectively in accord with the stopped positions of the pendulum.

The first object of providing a series of signals that varies directly with the degree of deviation is accomplished by arranging for the coding rod to operate the stop elements in the opposite order to the sequence of the stop shoulders that are traversed by the pendulum. Since inherently the magnitude of movement of the pendulum varies inversely with the deviation from vertical, the reversal in the order of the operation of the stop elements causes the range of responsive movement of the plunger to vary directly with the deviation of the bore hole. Thus, the longer the movement of the controlling pendulum, the shorter the movement of the signal-creating plunger.

The second object of shortening the length of the instrument case is accomplished by reducing the range of movement of the pendulum. The structural separation of the pendulum from the signal-creating plunger makes this change possible without undesirably reducing the range of movement of the plunger.

The third object of avoiding excessive loading of the pendulum in tension is accomplished by the separation of the pendulum from the plunger structure. When reverse flow of the drilling fluid occurs, with consequent extension pull on the signal-creating plunger, the force is opposed not by the pendulum but by the stop elements associated with the stop tube. Avoiding heavy loads on the pendulum makes it possible to use a highly sensitive pendulum to control an exceedingly rugged signal-generating mechanism.

The fourth object of drastically reducing the "down" time required to derive a deviation indication is accomplished by synchronizing the short range of pendulum movement with only a minor initial portion of the longer range of plunger movement and by further providing means to lock the coding rod securely in its selected position in response to continued extension of the plunger after the pendulum stops. The locking operation is completed during approximately the initial fifth of the extension movement of the plunger. The "down" time required is no more than 15 seconds and in actual practice is substantially less since a new length of drill pipe cannot be added until the mud stream is completely decelerated but the spring-actuated extension of the plunger begins when the mud stream is only partially decelerated.

Heretofore it has been necessary to avoid disturbing the drill string until after the signals are generated by starting up the mud pumps. To attempt to manipulate the drilling equipment, for example, to add a length of drill pipe before starting the mud pumps would be to risk disengaging the pendulum from a deviation shoulder to result in an erroneous deviation indication. With the coding rod locked, however, to make the instrument immune to shocks this risk is completely eliminated. Thus, the invention automatically provides a deviation measurement every time the pumps are started up after any pause such as a pause for the addition of a length of drill pipe and the cost, if any, in additional "down" time is merely a pause of less than 15 seconds when the mud pumps are stopped.

As will be explained, other objects of the invention include: to provide a time delay valve to delay the signal-creating retraction of the plunger until the velocity of the newly started stream of drilling fluid becomes relatively stable; to provide a non-clogging orifice means for controlling the rate of retraction of the plunger; to provide a relief valve to prevent a destructive rise in the pressure of the liquid in the instrument; to provide interchangeable sets of rings to serve as stop shoulders for the pendulum; to provide a readily removable and replaceable valve assembly for the instrument; and to make the inner annular stop shoulder of the plunger separable from the plunger proper to prevent overstressing of the stop tube and its selective stop elements.

The various features, objects and advantages of the invention may be understood by reference to the following detailed description taken with the accompanying drawings.

In the drawings, which are to be regarded as merely illustrative.

Figure 1:
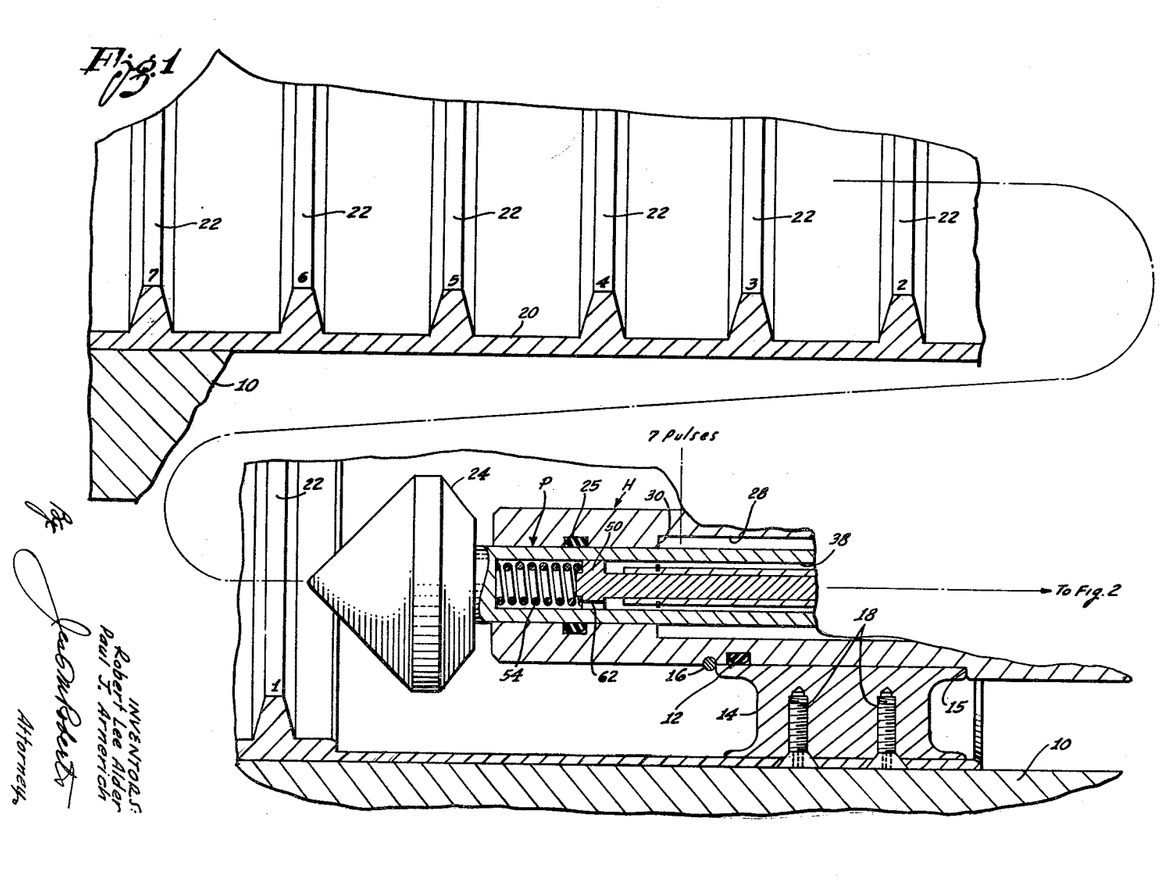
FIG. 1 is a simplified axial sectional view of two successive longitudinal sections of the presently preferred embodiment of the invention.
Figure 2:
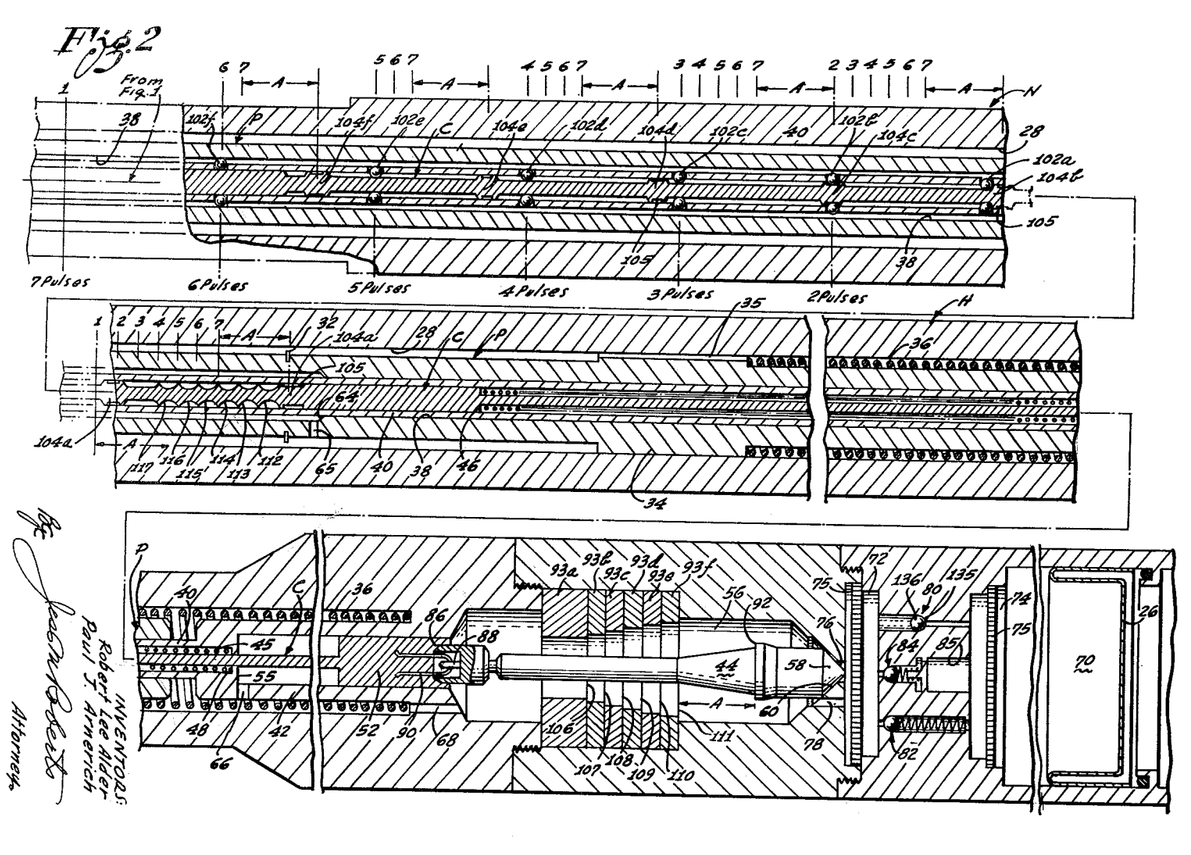
FIG. 2 is a similar view of the remaining three successive longitudinal sections of the instrument.
Figure 7:
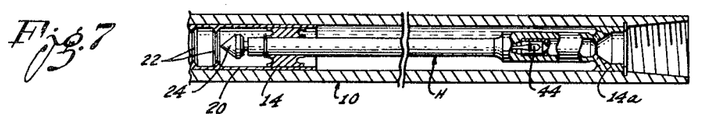
FIG. 7 is a small scale sectional view showing the instrument mounted in a special sub in a drill string.

FIG. 7 shows how the instrument is installed in a drill string and FIGS. 1 and 2 taken together show successive sections covering the full length of the instrument with the various working parts in their normal positions. The parts stay in these positions so long as the stream of drilling fluid flows down the drill stream of the usual drilling velocity with the impact or the dynamic pressure of the drill stream holding the signal-generating plunger at its fully retracted position.

The selected embodiment of the invention provides an instrument case or housing, generally designated by the letter H, which in this instance is snugly mounted in a special sub, generally designated by the numeral 10. The sub 10 is incorporated in the lower end of a drill string adjacent the rotary bit in a well known manner. As heretofore indicated, the sub 10 differs from a conventional sub or drill collar in being enlarged in internal diameter to provide ample capacity for flow of the drilling fluid through the sub past the instrument housing H.

As indicated in FIG. 7 and in the lower section of FIG. 1, the upper end of the housing H is supported concentrically in the sub 10 by a ring 12 having a pair of diametrically opposite radial spacer projections 14. The ring 12 backs against a shoulder 15 of the housing H and is retained by a snap ring 16. In the construction shown the two radial projections 14 are attached by screws 18 to a cylinder 20 that fits snugly inside the sub 10 and extends above the upper end of the housing H.

The cylinder 20 is formed with a series of equally spaced restrictions in the form of rings or inner circumferential ribs 22. A plunger that is generally designated by the letter P protrudes axially from the upper end of the housing H and is formed with an enlargement or head 24 which traverses the series of restrictions 22 for cooperation therewith to generate the deviation-indicating signals in the stream of drilling fluid. In this instance there are seven restrictions which are correspondingly numbered in FIG. 1 beginning with the lowermost restriction nearest the fully retracted position of the plunger head 24.

The lower end of the housing H is also concentrically supported inside the sub 10, for example by a second pair of diametrically opposite radial spacer projections 14a as indicated in FIG. 7. Thus the instrument housing H forms with the surrounding sub 10 an ample passageway for the drilling fluid. The housing H, together with the cylinder 20 that provides the seven restrictions, is conveniently removable from the sub as a unit.

The instrument housing H is filled with a suitable instrument liquid which is subjected to the hydrostatic pressure of the column of drilling fluid in the drill string. The upper end of the instrument housing is sealed by an O-ring 25 (FIG. 1) embracing the plunger P and the opposite or lower end of the instrument housing is closed by a movable wall in the form of a bag-shaped diaphragm 26. As the plunger P extends and retracts, the diaphragm 26 correspondingly moves inward and outward in accord with the displacement of the instrument liquid. Thus for given temperature and pressure conditions the total displacement of the surrounding drilling fluid by the instrument housing and the plunger remains constant throughout the cycle of operation of the instrument.

The housing H is formed with a relatively large axial bore 28 for the plunger P. The upper end of the bore 28 is reduced in diameter to guide the plunger P and to form an inner annular stop shoulder 30 for abutment by a snap ring 32 on the plunger (middle section of FIG. 2) to determine the maximum upward extension of the plunger. The plunger P is further guided by an integral guide collar 34 that slides in the axial bore 28 and is formed with a longitudinal groove 35 for displacement flow of the instrument liquid. What may be termed a plunger spring 36 surrounds the lower end of the plunger and acts in compression between the guide collar 34 and the bottom end of the axial bore 28 to urge the plunger towards its fully extended position. The plunger P is formed with a relatively large axial bore 38 which extends upward from the lower end of the plunger and terminates near the plunger head 24 as shown in the lower section of FIG. 1.

United with the fixed structure of the instrument housing H is a tubular structure that extends upward concentrically in the axial bore 28 of the housing and telescopes into the axial bore 38 of the plunger P. This fixed tubular structure comprises a stop tube 40 having an enlarged base portion 42. For clarity the drawings show the stop tube 40 and its base portion 42 as integral with the instrument housing but in actual practice the tubular structure is separately fabricated.

A coding rod, generally designated by the letter C, is slidingly mounted both in the stop tube 40 and its base portion 42 and pivotally carries at its lower end a suitable deviation-detecting pendulum 44. The coding rod C together with the pendulum 44 follows the initial upward extension movement of the plunger P and for this purpose what may be termed a pendulum lift spring 45 acts in compression between an annular shoulder 46 of the coding rod and an inner circumferential shoulder 48 in the base portion 42 of the stop tube. For guidance the coding rod C is formed with an enlargement 50 at its upper end (lower section FIG. 1) and is formed with a piston-like enlargement 52 at its lower end (lower section FIG. 2).

In the normal position of the parts with the plunger P fully retracted and the pendulum 44 at its lowermost position, the coding rod C is held down by a short coil spring 54 that has a higher spring rate than the pendulum lift spring 45. The spring 54 acts in compression between the upper coding rod enlargement 50 and the upper end of the axial bore 38 of the plunger. The lower enlargement 52 of the coding rod C cooperates with a radial shoulder 55 in the base portion 42 of the stop tube 40 to limit the upward movement of the coding rod and the associated pendulum 44. The pendulum 44 hangs in a pendulum chamber 56 and is formed with a conical nose which normally rests in a conical seat 60 at the lower end of the pendulum chamber, the pendulum being normally pressed into the seat by the force of the short coil spring 54.

Various provisions are made for displacement flow of the instrument liquid. The enlargement 50 of the coding rod 40 is provided with a longitudinal peripheral groove 62 and the upper portion of the axial bore 38 of the plunger is enlarged to provide an annular space around the stop tube 40. This annular space terminates at an inner annular tapered stop shoulder 64 (middle section FIG. 2) formed in the axial bore 38. At least one radial bore 65 in the plunger P adjacent the tapered stop shoulder 64 places the axial bore 38 of the plunger in communication with the axial bore 28 of the instrument housing H. At least one radial bore 66 (lower section of FIG. 2) permits displacement flow into and out of the interior of the base portion 42 of the stop tube and at least one longitudinal bore 68 permits displacement flow between the axial bore 28 of the instrument housing and the pendulum chamber 56.

For displacement flow of the instrument liquid between the pendulum chamber 56 and a diaphragm chamber 70 adjacent the diaphragm 26, the pendulum chamber 56 communicates with a filter chamber 72 which in turn communicates with a second filter chamber 74 that is open to the diaphragm chamber 70. The two filter chambers 72 and 74 are spanned by replaceable filter disks 75. The pendulum chamber 56 is connected with the filter chamber 72 by an axial bore 76 in the conical seat 60 and additionally by at least one eccentrically positioned longitudinal bore 78. The filter chamber 72 communicates with the filter chamber 74 through a check valve, generally designated 80, through a relief valve, generally designated 82, and also through a time delay valve, generally designated 84, that is in parallel with the relief valve. The time delay valve 84 is in series with orifice means in a dashpot chamber 85. These three valves and the dashpot means will be described specifically hereinafter.

As shown in the lower section of FIG. 2, the upper end of the pendulum 44 is chamfered to seat normally in a tapered recess 86 in the lower end of the coding rod C. The upper end of the pendulum 44 is formed with a bail 88 which extends through a bail 90 that is embedded in the coding rod, the two bails cooperating to provide a lost motion connection that permits the pendulum either to seat in the tapered recess 86 or to hang from the coding rod in a sensitive pivotal manner.

The pendulum 44 is formed with a sharp upwardly directed circumferential shoulder 92 for selective engagement with six inner annular stop shoulders in the pendulum chamber that correspond with six of the seven restriction rings 22 that cooperate with the plunger head 24 for the creation of deviation-indicating signals. If the pendulum passes all of the annular stop shoulders it reaches a limit position corresponding to the lowermost restriction ring 22. A feature of this embodiment of the invention is the fact that the series of six stop shoulders are formed by a replaceable stack of six stop rings 93a-93f.

Since there are seven restriction rings 22 for creation of deviation-indicating signals and seven corresponding deviation-indicating positions of the pendulum 44, there are seven corresponding positions at which the plunger head 24 must be stopped in preparation for creating the signals. One position of the plunger P which is the position of maximum extension that places the plunger head 24 beyond the seventh restriction ring 22 is determined by the abutment of the previously mentioned stop ring 32 (middle section of FIG. 2) against the inner annular stop shoulder 30 of the instrument housing H. To stop the plunger at the remaining six positions selectively, the stop tube 40 has six equally spaced sets of radial apertures to house six corresponding sets of stop elements in the form of six sets of small hard metal balls, designated respectively 102a, 102b, 102c, 102d, 102e, and 102f, for cooperation selectively with the previously mentioned tapered inner stop shoulder 64 of the plunger P (middle section of FIG. 2). Normally all of the stop balls 102a-102f are free to retract to radially inward positions within the outside diameter of the stop tube 40 to permit the annular stop shoulder 64 of the plunger P to pass. The coding rod C has six circumferential enlargements designated 104a-104f, respectively, for cooperation with the six sets of stop balls 102a-102f, each enlargement being formed with a circumferential groove 105 to register with the radial set of balls.

If the circumferential shoulder 92 of the pendulum clears all six of the inner annular stop shoulders to reach its maximum upward position inside the stop ring 93a, the coding rod enlargement 104a shown in the middle section of FIG. 2 moves into register with the set of stop balls 102a to shift the stop balls radially outward to their effective positions for engagement by the inner tapered shoulder 64 of the plunger P to stop the plunger at a position placing the plunger head 24 between the two restriction rings 22 that are numbered 1 and 2. Consequently the subsequent retraction of the plunger P carries the plunger head 24 past only one restriction ring to create only one deviation-indicating signal.

If the circumferential shoulder 92 of the upwardly moving pendulum engages the stop shoulder 106 formed by the stop ring 93a to come to rest within the stop ring 93b, the coding rod enlargement 104b moves into register with the stop balls 102b to cause the plunger head 24 to come to rest between the restriction rings numbered 2 and 3 to result in two signals when the plunger is subsequently retracted. In like manner, when the circumferential shoulder 92 of the pendulum is stopped inside the stop ring 93c by the stop shoulder 107 the enlargement 104c of the coding rod moves into register with the stop balls 102c to stop the plunger head 24 between the restriction rings numbered 3 and 4 to result in three signals. The stop shoulder 108 stops the circumferential shoulder 92 of the pendulum within the stop ring 93d to bring the coding rod enlargement 104d into register with the set of stop balls 102d to produce four signals. When the circumferential shoulder 92 of the pendulum is stopped by the stop shoulder 109 within the stop ring 93e the coding tube enlargement 104e moves into register with the set of stop balls 102e to produce five signals.

Figures 3, 4:
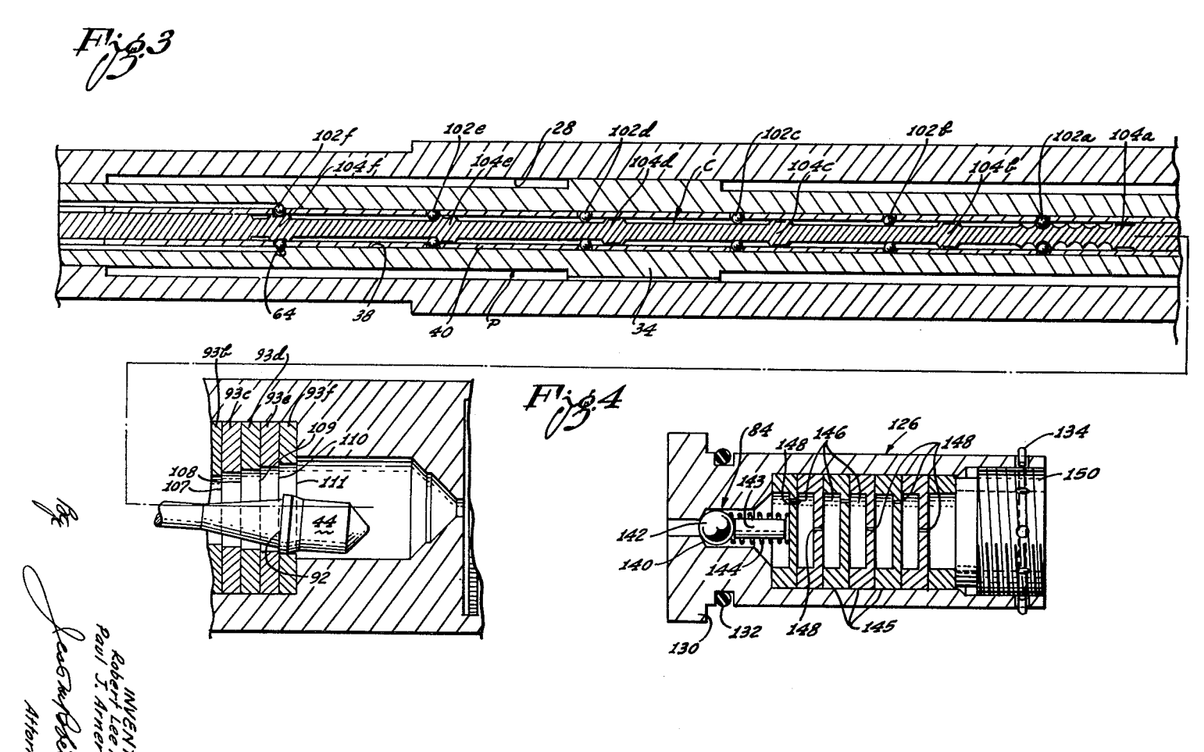
FIG. 3 is a similar simplified view in two sections showing the pendulum and the associated coding rod positioned in accord with a degree of inclination of the instrument from vertical that causes the pendulum to engage the second stop shoulder.
FIG. 4 is an enlarged sectional view of a removable cartridge that provides a time delay valve together with a dashpot means in series therewith.

FIG. 3 shows the circumferential shoulder 92 of the pendulum stopped in the stop ring 93f by the stop shoulder 110 and shows the coding rod enlargement 104f correspondingly moved into register with the set of stop balls 102f. The inner annular stop shoulder 64 of the plunger P is shown stopped by the set of balls 102f to result in six signals.

Finally, if the circumferential shoulder 92 of the pendulum engages the stop shoulder 111 and is thereby prevented from entering the set of stop rings, none of the sets of stop balls 102a–102f are made effective for cooperation with the inner tapered shoulder 64 of the plunger P. The plunger P then extends to its maximum position at which the stop ring 32 of the plunger abuts the inner annular stop shoulder 30 of the instrument housing H to place the plunger head 24 beyond the restriction ring numbered 7 for the subsequent generation of seven signals when the plunger is retracted.

It will be noted in the lower section of FIG. 2 that the circumferential shoulder 92 of the pendulum travels the distance "A" to reach the first stop shoulder 111. In the two upper sections of FIG. 2 the distance each of the enlargements 104a–104f travels to register with the corresponding set of stop balls 102a–102f is indicated by the distance "A" plus a succession of steps which correspond to the distances between the successive stop shoulders of the stop rings 93a–93f. It is apparent that there is a reversal in the order of the sets of stop balls 102a–102f with respect to the sequence of the stop rings 93a–93f and therefore there is a corresponding reversal in the order of the positions at which the plunger head 24 is stopped. Thus when the coding rod C shifts the maximum distance the coding rod enlargement 104a moves the distance "A" plus six steps to result in the production of a single signal. When the coding rod C moves the distance "A" plus one step, the coding rod enlargement 104f moves the distance "A" plus one step to create six signals. When the coding rod moves only the minimum distance "A" to the stop shoulder 111, none of the coding rod enlargements 104a–104f registers with a set of stop balls 102a–102f and the pendulum moves to its limit position for the production of seven signals.

The means for locking the coding rod C at its various stopped positions early in the extension movement of the plunger P comprises the coding rod enlargement 104a and six circumferential locking grooves 112–117 adjacent this enlargement. The enlargement 104a and all six of the circumferential grooves 112–117 cooperate selectively with one set of stop balls 102a.

If the coding rod C shifts its maximum distance to place the coding rod enlargement 104a in register with the locking balls 102a, the engagement of the locking balls 102a by the inner annular tapered shoulder 64 of the plunger P effectively locks the coding rod because of the force exerted on the plunger P by the plunger spring 36. At the remaining six stopped positions of the coding rod C one of the locking grooves 112–117 registers with the set of locking balls 102a to lock the coding rod in position and thus making the coding rod immune to shock.

If the coding rod C shifts one step less than its maximum distance to cause the set of stop balls 102b to be made effective by the coding rod enlargement 104b for blocking the inner tapered stop shoulder 64 of the plunger P, the circumferential locking groove 112 registers with the set of locking balls 102a, permitting the locking balls 102a to take their inner ineffective positions within the outer diameter of the stop tube 40. When the inner tapered stop shoulder 64 of the plunger P passes beyond the inwardly retracted set of stop balls 102a, it traps the stop balls in the circumferential locking groove 112 whereupon the trapped locking balls cooperate with the corresponding apertures in the stop tube 40 to lock the coding rod in position.

In like manner, the circumferential locking groove 113 registers with the locking balls 102a when the coding rod enlargement 104c registers with the stop balls 102c; the circumferential locking groove 114 registers with the locking balls 102a when the coding tube enlargement 104d registers with the set of stop balls 102d; the circumferential locking groove 115 registers with the set of locking balls 102a when the coding rod enlargement 104e registers with the locking balls 102e; and the circumferential locking groove 116 registers with the set of locking balls 102a when the coding rod enlargement 104f registers with the set of locking balls 102f. When the circumferential shoulder 92 of the pendulum engages the first locking shoulder 111 without making any of the sets of locking balls 102a–102f effective to block the movement of the inner tapered shoulder 64 of the plunger P, the last locking groove 117 registers with the set of locking balls 102a to cause the coding rod to be locked by the passing of the inner tapered shoulder 64 of the plunger P.

It is apparent that since the inner tapered shoulder 64 of the plunger P passes the set of locking balls 102a very early in the outward extension movement of the plunger, the coding rod C is locked in position promptly. In this embodiment of the invention the maximum range of extension of the plunger P is on the order of 12 inches and the coding rod C is locked by the time the plunger extends only 2 inches from its normal retracted position.

Figure 5:
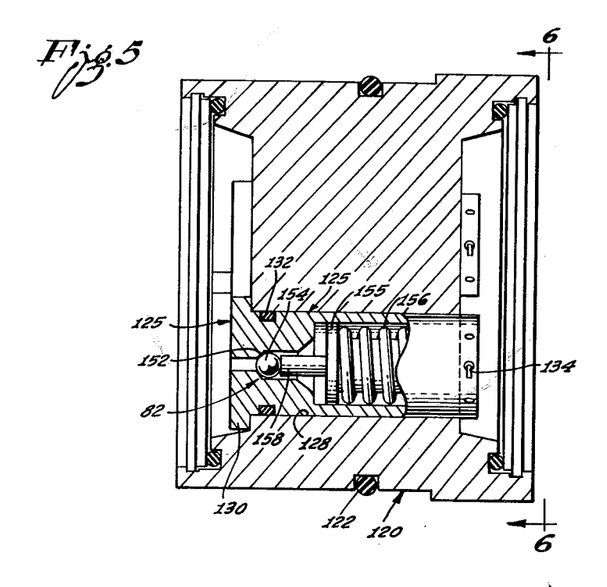
FIG. 5 is an axial sectional view of an assembly unit that includes the removable cartridge of FIG. 4 together with other removable cartridges including a relief valve cartridge that is shown in section.
Figure 6:
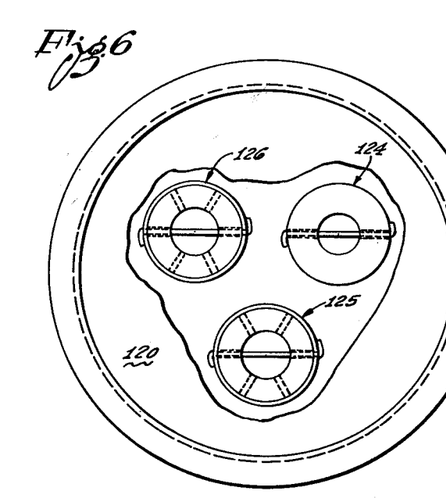
FIG. 6 is an end view of the assembly unit shown in FIG. 5.

In the preferred practice of the invention, the previously mentioned three valves 80, 82 and 84 are in the form of cartridge-like units that are removably mounted in a cylindrical metal block 120 shown in FIGS. 5 and 6. The cylindrical metal block 120 in turn is mounted in the instrument housing H in a removable manner and is circumferentially grooved to receive an O-ring 122. The check valve 80 is in a cartridge 124; the relief valve 82 is in a cartridge 125 and the time delay valve 84 together with the previously mentioned dash-pot means is in a third cartridge 126.

As indicated in FIG. 5, such a cartridge, in this instance cartridge 125, may be mounted in a bore 128 in the cylindrical metal block 120 and may be formed with a flange 130 at one end to abut one end of the bore. Each of the cartridges has a circumferential groove to receive a sealing O-ring 132 and each of the cartridges is secured in position by a pliable pin 134 that is mounted diametrically in its second end.

The cartridge 124 for the check valve 80 is a one-piece tubular body which provides a fluid passage of the configuration shown in the lower section of FIG. 2. The fluid passage forms a seat 135 for a gravity biased valve ball 136.

The cartridge 126 that provides the time delay valve 84 and the associated dashpot means may be of the construction shown in FIG. 4. To provide the time delay valve 84, the flow passage through the cartridge 126 forms a seat 140 for a valve ball 142. The valve ball abuts a spacer pin 143 and is urged into the seat by a suitable spring 144. The fluid passage is enlarged to receive a stack of recessed disks 145 which serve as partitions to form a succession of chambers 146. Each of the disks 145 is provided with a small orifice 148 to permit the instrument liquid to flow through the chambers in series, each of the orifices 148 being offset from the adjacent orifices. The stack of disks 145 is secured by a bushing 150 that threads into the end of the cartridge and is secured by the previously mentioned diametrical pin 134.

Each of the orifices 148 is large enough to pass with ease foreign particles of the size that may normally be found in the liquid in an instrument of this type. Each of the orifices 148 taken alone would not provide the retarding effect on the instrument liquid that is required for the desired dashpot action but since the orifices are in series the net effect is to retard the instrument liquid to the same degree as a single orifice that would be too small to pass the foreign particles freely.

The cartridge 125 that provides the relief valve 82 may be of the construction shown in FIG. 5. The fluid passage through the cartridge provides a seat 152 for a valve ball 154. A floating disk 155 is under pressure from a valve spring 156 and is provided with an axial pin 158 which presses against the valve ball 154 to urge the valve ball into the seat.

The manner in which the invention serves its purpose may be readily understood from the foregoing description. FIG. 1 together with FIG. 2 shows the normal positions of the working parts of the drift indicator, i.e., the positions assumed when the drift indicator is at the lower end of a drill string and the usual drilling operation is being carried out. The force of the downwardly flowing mud stream against the plunger head 24 keeps the plunger P in its normal fully retracted position in opposition to the pressure exerted by the plunger spring 36, the pendulum lift spring 45 and the short spring 54. The check valve 80, the relief valve 82, and the time delay valve 84 are all closed with the diaphragm chamber 70 filled to maximum with the instrument liquid. The pendulum is under compression by spring pressure with the bottom end of the pendulum in the seat 60 and with the upper end of the pendulum in the recess 86.

Under these conditions both the drilling operation and the operation of the mud pumps may be stopped for approximately one minute any time it is desired to cause the deviation detector to go through its cycle of operation. As heretofore emphasized, however, the deviation detector will go through its operating cycle automatically whenever the drilling operation is interrupted for the addition of a new length of drill pipe to the string. The advantage of the invention in this regard may be appreciated by describing the manner in which the operating cycle is carried out automatically whenever drilling is interrupted for the addition of a length of drill pipe to the string.

In preparation for the addition of a length of drill pipe, both the drilling operation and the operation of the mud pumps are stopped. When the mud pumps are stopped it is necessary to wait until the mud stream is completely decelerated before the connection between the mud pumps and the drill string is broken. Otherwise, mud would spurt from the broken connection. Consequently, the drilling crew must wait for a short period of time after the mud pumps stop before proceeding with the task of adding the length of drill pipe. Within this brief period of time the following sequence of operations occurs automatically.

When the stream of drilling fluid is substantially but incompletely decelerated following the stopping of the mud pumps, the reduced impact force against the plunger head 24 permits the plunger spring 36 to start the upward extension movement of the plunger P. The check valve 80 opens freely to permit the displacement of the instrument liquid from the diaphragm chamber 70 through the pendulum chamber 56 into the upper fluid passages of the instrument as required for the extension movement of the plunger.

The upward movement of the pendulum 44 is stopped by engagement of the circumferential shoulder 92 of the pendulum with one of the stop rings 93a–93f if the deviation of the bore hole from vertical is greater than ½°. If the bore hole deviation from vertical is less than ½° the circumferential shoulder 92 of the pendulum is carried upward the maximum distance to come to rest inside the uppermost and smallest stop ring 93a.

If the upward movement of the coding rod C is stopped by engagement of the circumferential pendulum shoulder 92 with one of the stop rings 93a–93f, the resulting position of the coding rod causes one of the sets of stop balls 102a–102f to expand radially outward into the path of the upwardly advancing tapered inner stop shoulder 64 of the plunger P to stop the plunger. If the pendulum catches on the first lowest stop shoulder, none of the sets of stop balls 102a–102f is expanded and the plunger P continues to its upper limit position at which the stop ring 32 of the plunger meets the stop shoulder 30 of the instrument housing H.

If the tapered inner stop shoulder 64 of the plunger P is stopped by the first set of stop balls 102a to indicate that the deviation of the bore hole from vertical is less than ½°, the plunger P acting under the pressure of the plunger spring 36 cooperates with the set of stop balls 102a to lock the coding rod C in place and thus make the coding rod immune to subsequent shocks that may occur in the course of adding the new string of drill pipe. If the deviation of the well bore from vertical is greater than ½°, however, the upward movement of the coding rod C will terminate before the tapered inner shoulder 64 of the plunger P reaches the first set of stop balls 102a and the stop balls 102a will register with one of the circumferential locking grooves 112–117 of the coding rod C. When the tapered inner shoulder 64 of the plunger P reaches the stop balls 102a under these conditions, it cams the set of stop balls 102a into the selected circumferential locking grooves 112–117 to lock the coding rod C against any possible shift by any subsequent shock imparted to the drill string.

It is to be noted that the upward extension movement of the plunger P is accelerated by the rapidly dropping velocity of the drilling fluid. It is also important to note that the whole sequence that culminates in the locking operation occurs in an initial portion of the upward movement of the plunger that is only a fraction of the maximum range of upward movement of the plunger. In addition, this initial portion of the upward extension movement of the plunger P is appreciably boosted briefly by the relatively strong spring 54 and in a more prolonged manner by the pendulum lift spring 45. Consequently the whole sequence of operations to the point of locking the coding rod C is completed in less than 15 seconds.

Since the sequence starts well before the drilling stream is fully decelerated, it is normally completed by the time the driller deems it to be safe to break the connection between the mud pump and the drill string. It is apparent, then, that the drilling crew may carry out the usual routine for adding a length of drill pipe to the string without appreciable delay due to operation of the deviation detector. Jarring of the drill string is unavoidable in the operation of adding the length of drill pipe but no amount of such jarring will release the coding rod C from its selected locked position.

When the operation of the mud pumps is resumed, the force of the drilling fluid on the head 24 of the plunger P soon rises to a point sufficient to overcome the force exerted by the extended plunger spring 36. The responsive downward movement of the plunger P is delayed beyond this point, however, by the spring pressed time delay valve 84 since no fluid can flow through the dashpot orifices 148 until pressure above the time delay valve is sufficient to overcome the closing force exerted by spring 144. The additional delay affords time for the downwardly flowing stream of drilling fluid to become stable. The addition of the length of drill pipe to the drill string inevitably traps a body of air in the mud stream and the added time provided by the time delay valve 84 permits the trapped air to be carried well down the string and to be compressed heavily or completely entrained in the mud stream. Thus the addition of the time delay valve 84 prevents the pressure pulses generated by the signal-generating mechanism from being disturbed by the random fluctuations in the mud stream pressure caused by starting up the pumps and also keeps the signal-generating and transmission process from being disturbed by the "surge chamber" effect of the newly trapped air in the system. Consequently the signals are delayed until a smooth background pressure is established to make the signal pressure pulses stand out clearly.

Once the time delay valve 84 opens, the instrument liquid is driven downward through the series of dashpot orifices into the diaphragm chamber 70 to retard the downward movement of the plunger P to the desired relatively slow rate. The restriction to flow presented by the series of dashpot orifices alternating with the series of small chambers is surprisingly high even with instrument liquid of moderate viscosity to result in the optimum time-spacing of the pressure pulse signals.

The downward movement of the plunger P gives rise to brief periods of restricted flow of the drilling fluid as the plunger head 24 passes through the restriction rings 22 that lie between the selected extended position of the plunger head and the fully retracted position of the plunger head. Each occurrence of restricted flow creates a sudden rise in pressure in the mud column. Each pressure rise travels to the surface in the form of a wave at sonic velocity that can readily be detected by observing a suitable pressure gauge or by employing any other suitable pressure-sensing device in communication with the mud circulating system.

The features that protect the instrument from damage are important. It is impossible to subject the pendulum to a greater load in tension than the force exerted by the pendulum lift spring 45 regardless of the behavior of the mud stream. Thus the invention permits the pendulum to be of relatively delicate construction as required for high sensitivity. If the impact force against the plunger head 24 of the downwardly flowing mud stream should be increased by a sudden high velocity surge to a magnitude that would tend to create destructive hydraulic pressure within the instrument, the relief valve 82 comes into play to permit such freedom of flow of the instrument liquid from the pendulum chamber 56 into the diaphragm chamber 70 as to keep the hydraulic pressure within moderate bounds.

FIGS. 8 to 11 indicate various ways in which the construction of the instrument shown in FIGS. 1 to 6 may be modified by making the plunger P in two sections which separate under an excessive tension load on the plunger to prevent damage to the mechanism that is employed to limit the extension of the plunger selectively in preparation for measuring deviation. The need for such a modification occurs in the event that the lowering of the drill string into the well bore reverses the flow of the drill stream violently upward to tend to lift the plunger head 24.

Figure 8:
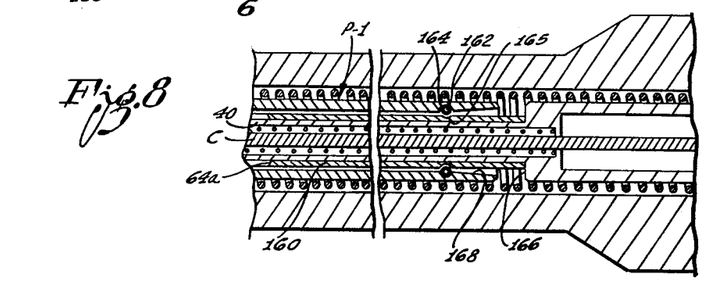
FIG. 8 is a fragmentary sectional view illustrating a useful modification of the signal-generating plunger.

FIG. 8 shows how the plunger P may be made in two telescoping sections that may normally be held together in a releasable manner by suitable detent means. In the construction shown in FIG. 8, the plunger P-1 is of the previously described construction except that the tapered inner annular stop shoulder 64a of the plunger is the end of a sleeve 160 that slidingly telescopes into the plunger. The sleeve 160 is normally united with the plunger proper by a detent spring 162 in the form of a split ring. The detent spring 162 is biased radially outward to seat partially in an inner circumferential groove 164 in the plunger proper and partially in an outer circumferential groove 165 in the sleeve 160.

If the sleeve 160 is in a stopped position with the inner tapered shoulder 64a in abutment with one of the sets of stop balls 102a–102f and the plunger P-1 is subjected to an unduly large force in the direction of extension of the plunger, the detent ring 162 is cammed inward into the circumferential groove 165 of the sleeve to permit the plunger proper to extend without the sleeve 160. When the plunger P-1 is subsequently retracted to its normal position, it pushes the sleeve 160 against a radial shoulder 166 of the stop tube structure and then a tapered inner circumferential surface 168 at the inner end of the plunger rides onto the detent spring 162. The detent spring is first cammed inward into the circumferential groove 165 of the sleeve and then expands outward into its normal position in the circumferential groove 164 in the plunger.

It is apparent that in the construction shown in FIG. 8 that a reverse upward flow of the drill stream sufficient to disengage the detent means permits the plunger head 24 to rise to its limit position. In this manner the plunger is temporarily structurally disconnected from the stop balls 102a–102f to avoid damage to the stop balls and to the stop tube 40 in which the stop balls function.

Figure 9:
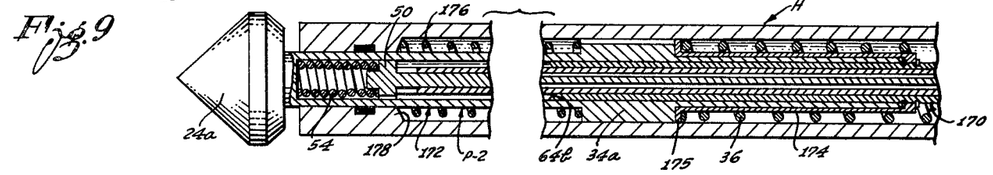
FIG. 9 is a similar view of another modification of the signal-generating plunger.

In FIG. 9 the plunger P-2 is made in two separable parts comprising a lower section, generally designated 170, and an upper section, generally designated 172. The lower section 170 provides the tapered stop shoulder 64b for cooperation with the stop balls. The upper plunger section 172 includes the usual guide collar 34a and carries the usual plunger head 24a. The lower plunger section 170 carries a tubular spring seat 174 that is formed with a radial flange 175 to receive the lifting pressure of the usual plunger spring 36.

A light spring 176 having a substantially smaller spring rate than the spring 36 acts in compression between the guide collar 34a and an upper stop shoulder 178 formed by the instrument housing H. Normally, the light spring 176 urges the guide collar 34a against the flange 175 of the spring seat member 174 to maintain the two plunger sections in the desired assembled relationship. If an excessive lifting force acts on the plunger head 24a, however, the upper plunger section separates from the lower plunger section against the opposition of the relatively light spring 176. It is apparent therefore that by virtue of this arrangement the pressure of the inner annular stop shoulder 64 of the plunger against a set of stop balls 102a–102f can never exceed the pressure exerted by the main plunger spring 36.

Figures 10, 11:
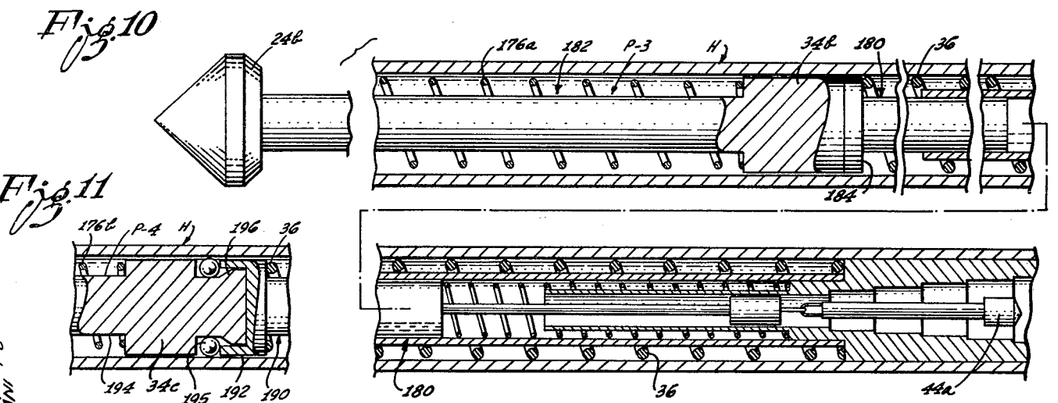
FIG. 10 is a fragmentary sectional view showing a simplified version of the instrument with a modified signal-generating plunger.
FIG. 11 is a fragmentary view of another modification of the signal-generating plunger.

In the construction shown in FIG. 10, the plunger P-3 is again made in two separate sections comprising a lower section, generally designated 180, and an upper section, generally designated 182. The lower plunger section 180 is formed with a head or radial flange 184 to receive the pressure of the usual plunger spring 36. The upper plunger section 182 has the usual guide collar 34b and the usual exterior head 24b. A relatively light spring 176a acts against the guide collar 34b to urge the two plunger sections together whereby the two sections of the plunger function in the same manner as the two plunger sections of FIG. 9.

FIG. 10 also illustrates the fact that the pendulum 44a may be directly mounted on the lower end of the lower plunger section 180 since the capability of the plunger to separate in the manner described makes it impossible for the pendulum to be subjected to a greater load than the force exerted by the plunger spring 36. Such a construction does not have the advantage of reversing the sequence of the signals and requires that the overall length of the instrument be increased, but the construction is relatively simple and may be employed advantageously in some instances.

FIG. 11 illustrates another manner in which a plunger P-4 may comprise two separate sections. The lower section 190 forms at its upper end a cup-shaped member 192 and the upper plunger section 194 telescopically seats in this cup-shaped member. The usual plunger spring 36 presses upward against the cup-shaped member 192 and the usual light spring 176b presses downward against the guide collar 34c to urge the upper plunger section into the cup-shaped member.

When the upper plunger section 194 is fully seated in the cup-shaped member 192 by the pressure of the lighter spring 176b, a series of balls 195 interposed between the guide collar 34c and the cup-shaped member have liberal clearance to avoid interfering with the movements of the upper plunger section 194. The lower end portion of the upper plunger section 194 that seats in the cup-shaped member 192 is formed with a conical enlargement 196 that is capable of camming the balls 195 radially outward into locking engagement with the surrounding instrument housing H.

It is apparent that whenever an excessive lifting force acts on the upper plunger section 194, the upper plunger section separates from the lower plunger section 190 but moves only a short distance until the conical enlargement 196 cams the balls 195 outward to lock the upper plunger section against further separation movement. Thus this construction not only eliminates the possibility of applying an excessive tension load on the lower plunger section 190 but also limits the separation movement between the two plunger sections to a relatively small movement.

Our description in specific detail of the selected embodiments and modifications of the invention will suggest various changes, substitutions, and other departures from our disclosure within the spirit and scope of the appended claims.

We claim as our invention:

1. In a signalling drift indicator for use in a downward stream of drilling fluid in a drill string in a well bore wherein the drift indicator has a housing for positioning in the drill string longitudinally thereof, a plunger protruding longitudinally from the housing for extension and retraction relative thereto to generate a series of spaced signals by downward movement in response to force by the stream of drilling fluid, and means to urge the plunger upward, the combination therewith of: a pendulum in said housing movable longitudinally in response to the upward movement of the plunger; means responsive to the inclination of the housing relative to the pendulum to limit the movement of the pendulum in accordance with the inclination of the housing; and means responsive to the pendulum to limit the upward movement of the plunger inversely as the magnitude of movement of the pendulum whereby the number of signals generated by the return downward movement of the plunger varies directly with the degree of inclination of the housing from vertical.

2. In a signalling drift indicator for use in a stream of drilling fluid in a drill string in a well bore wherein the drift indicator has a housing for positioning in the drill string longitudinally thereof, a plunger protruding longitudinally from the housing for extension and retraction relative thereto to generate signals by movement in response to force by the stream of drilling fluid, and means to urge the plunger in the direction counter to the direction of the stream of drilling fluid, the combination therewith of: a pendulum in said housing separate from the plunger to move over a range substantially shorter than the range of movement of the plunger in response to an initial portion of the movement of the plunger counter to the direction of the stream of drilling fluid; means responsive to the inclination of the housing relative to the pendulum to limit the movement of the pendulum over said short range in accord with different degrees of inclination of the housing; and means controlled by the relatively short longitudinal movements of the pendulum and effective over the longer range of movement of the plunger to stop the movement of the plunger counter to the direction of the stream of drilling fluid selectively at positions corresponding to the inclination-indicating positions of the pendulum.

3. A combination as set forth in claim 2 in which the return movement of the plunger in the direction of the stream of drilling fluid creates a series of spaced signals; in which said means responsive to the relative inclination of the housing limits the movement of the pendulum directly as the inclination of the housing; and in which said means controlled by the pendulum stops the movement of the plunger in the direction counter to the stream of drilling fluid at positions corresponding inversely to the positions of the pendulum whereby the number of signals generated by retraction of the plunger varies directly with the relative inclination of the housing.

4. In a signalling drift indicator for use in a downward stream of drilling fluid in a drill string in a well bore wherein the drift indicator has a housing for positioning in the drill string longitudinally thereof, a plunger protruding longitudinally from the housing to generate signals by downward movement in response to force by the stream of drilling fluid, and means to move the plunger upward from a normal position when the plunger is not subjected to force by the stream of drilling fluid, the combination therewith of: a pendulum in said housing separate from the plunger to move over a range substantially shorter than the range of movement of the plunger in response to an initial portion of the upward movement of the plunger; means responsive to the inclination of the housing relative to the pendulum to limit the movement of the pendulum over said short range in accordance with different degrees of inclination of the housing; a plurality of normally ineffective stops for said plunger distributed along the range of movement of the plunger and corresponding to the different inclination-indicating positions of the pendulum; and means extending along said series of stops and movable with the pendulum to make the stops effective selectively to stop the upward movement of the plunger in accord with the inclination-indicating positions of the pendulum.

5. A combination as set forth in claim 4 in which the downward movement of the plunger creates a series of spaced signals; in which said means responsive to the relative inclination of the housing limits the movement of the pendulum directly as the inclination of the housing; and in which said means movable with the pendulum makes the stops effective selectively to stop the upward movement of the plunger at positions varying inversely with the inclination-indicating positions of the pendulum whereby the number of signals generated by downward movement of the plunger varies directly with the relative inclination of the housing.

6. In a signalling drift indicator for use in a downward stream of drilling fluid in a drill string in a well bore wherein the drift indicator has a housing for positioning in the drill string longitudinally thereof, a plunger protruding longitudinally from the housing to generate signals by downward movement in response to force by the stream of drilling fluid, and means to move the plunger upward when the plunger is not subjected to the force of the stream of drilling fluid, the combination therewith of: a pendulum in said housing separate from the plunger to move over a range substantially shorter than the range of movement of the plunger in response to an initial portion of the upward movement of the plunger; means responsive to the inclination of the housing relative to the pendulum to limit the movement of the pendulum over said short range in accord with different degrees of inclination of the housing; a series of normally ineffective stop means distributed along the range of movement of said plunger to stop the upward movement of the plunger at points corresponding to said different degrees of inclination of the housing to result in a corresponding number of signals when the plunger is subsequently returned downward by the stream of drilling fluid; and coding means extending along said series of stop means and movable by the pendulum during said initial plunger movement to make the stop means effective selectively in accord with the position at which the pendulum stops.

7. A combination as set forth in claim 6 which includes means responsive to an initial portion of the upward movement of the plunger to lock said coding means in its selected position after the pendulum is stopped thereby to make the coding means immune to shocks whereby the drill string may be manipulated immediately after an initial portion of the upward movement of the plunger without changing the signals represented by the stopped position of the pendulum even if the manipulation of the drill string disengages the pendulum from the means for limiting the movement of the pendulum.

8. In a signaling drift indicator for use in a downward stream of drilling fluid in a drill string in a well bore wherein the drift indicator has a housing for positioning in the drill string longitudinally thereof, a plunger protruding longitudinally from the housing to generate signals by downward movement in response to force by the stream of drilling fluid, and means to move the plunger upward when the plunger is not subjected to the force of the stream of drilling fluid, the combination of: a pendulum in said housing movable longitudinally in response to the upward movement of the plunger; means responsive to the inclination of the housing relative to the pendulum to limit the movement of the pendulum directly as the inclination of the housing; a series of normally ineffective stop means distributed along the range of movement of the plunger to stop the upward movement of the plunger selectively at points corresponding to different degrees of inclination of the housing to result in a corresponding number of signals when the plunger is subsequently returned downward by the stream of drilling fluid; coding means extending along said series of stop means and movable by the pendulum to make the stop means effective selectively in accord with the degree to which the pendulum movement is limited; and means responsive to the extension movement of said plunger to lock said coding means in position after the pendulum is stopped during the extension of the plunger thereby to make the coding means immune to shock whereby the drill string may be manipulated immediately after the coding means is locked even if the manipulation of the drill string disengages the pendulum from the means for limiting the movement of the pendulum.

9. A combination as set forth in claim 8 in which said plunger is divided into two separate sections, one section to generate the signals and the other section to be engaged by and stopped selectively by said series of stop means; and in which said sections are separable whereby said two sections separate under a separation load to avoid imposing a damaging load on the selected stop means.

10. In a signalling drift indicator for use in a downward stream of drilling fluid in a drill string in a well bore wherein the drift indicator has a housing for positioning in the drill string longitudinally thereof, a plunger protruding longitudinally from the housing to generate signals by downward movement in response to force by the stream of drilling fluid, and means to move the plunger upward when the plunger is not subjected to the force of the stream of drilling fluid, the combination therewith of: a pendulum in said housing movable longitudinally in response to the upward movement of the plunger; means responsive to inclination of the housing relative to the pendulum to limit the movement of the pendulum directly as the inclination of the housing; an annular stop shoulder connected with said plunger for movement therewith; a stop tube fixedly mounted in said housing inside said annular stop shoulder and extending along the path of movement of the annular stop shoulder; stop elements mounted in said stop tube for movement between normal positions and effective positions in the path of said annular stop shoulder for cooperation therewith to stop the upward movement of the plunger; and a coding rod extending into said stop tube and movable with the penlulum to shift said stop elements from their normal positions to their effective positions selectively in accord with the limit positions of the pendulum.

11. A combination as set forth in claim 10 in which said stop elements are ball elements mounted in apertures in the stop tube.

12. A combination as set forth in claim 10 in which said annular stop shoulder and the adjoining longitudinal portion of the plunger that follows the stop shoulder in the extension movement of the plunger trap the stop elements at their retracted positions; and in which said coding rod is shaped to be engaged by at least one of said trapped elements at each of the stopped positions of the plunger thereby to make the coding means immune to shocks whereby the drill string may be manipulated without changing the signals even if the manipulations of the drill string disengages the pendulum from the means for limiting the movement of the pendulum.

13. In a signalling drift indicator for use in a downward stream of drilling fluid in a drill string in a well bore wherein the indicator has a housing for positioning in the drill string longitudinally thereof, a plunger protruding longitudinally from the housing to generate a series of signals by downward movement in response to force by the stream of drilling fluid, means to move the plunger upward when it is not subjected to the force of the drilling stream, and a gravity-responsive deviation-detector to limit the upward movement of the plunger in accord with the degree of deviation of the well bore from vertical, said housing being filled with a liquid and having a movable wall to permit displacement flow of the liquid in the housing in response to movement of the plunger whereby the combined volume of the housing and the protruding portion of the plunger is constant, the combination therewith of orifice means to retard the displacement flow of the liquid in the housing thereby to retard the signal-generating retraction movement of the plunger when flow of the stream of drilling fluid is initiated, said orifice means comprising: a series of chambers separated by spaced walls with orifices in the walls for flow of the liquid through the series of chambers in sequence, said orifices being of liberal dimensions for passage of finely divided foreign particles of a given magnitude without clogging, the total retarding effect of the series of orifices being equivalent to the retarding effect of a single orifice that is of a dimension close to said given magnitude.

14. A combination as set forth in claim 13 which includes a spring-loaded valve in series with said chambers to yieldingly oppose the displacement flow of the liquid through the series of chambers thereby to delay the downward movement of the plunger until the rate of flow of the drilling fluid rises to a predetermined magnitude.

15. A combination as set forth in claim 13 which includes a by-pass in parallel with said series of chambers; and which includes a spring-loaded relief valve normally closing said by-pass and yieldingly opposing the displacement flow caused by downward movement of the plunger, said relief valve yielding to a predetermined relatively high fluid pressure to keep the pressure of the liquid in the housing from rising to a destructive magnitude when the force of the stream of drilling fluid on the plunger rises excessively.

16. A combination as set forth in claim 13 in which the successive orifices in the successive walls are off-set out of alignment.

17. In a signalling drift indicator for use in a downward stream of drilling fluid in a drill string in a well bore wherein the indicator has a housing for positioning in the drill string longitudinally thereof, a plunger protruding longitudinally from the housing to generate a series of signals by downward movement in response to force by the stream of drilling fluid, means to move the plunger upward when it is not subjected to the force of the drilling stream, a gravity-responsive deviation detector to limit the upward movement of the plunger in accord with the degree of deviation of the well bore from vertical, said housing being filled with a liquid and having a movable wall to permit displacement flow of the liquid in the housing in response to movement of the plunger whereby the combined volume of the housing and the protruding portion of the plunger is constant, orifice means to retard the displacement flow of the liquid in the housing thereby to retard the signal-generating movement of the plunger when flow of the stream of drilling fluid is initiated, the combination therewith of: by-pass means in parallel with said orifice means, and a spring-loaded relief valve normally closing said by-pass and yieldingly opposing the displacement flow caused by downward movement of the plunger, said relief valve being normally closed and yielding to a predetermined high fluid pressure to keep the pressure of the liquid in the housing from rising to a destructive magnitude when the force of the drilling stream on the plunger rises excessively.

18. In a signalling drift indicator for use in a downward stream of drilling fluid in a drill string in a well bore wherein the indicator has a housing for positioning in the drill string longitudinally thereof, a plunger protruding longitudinally from the housing to generate a series of signals by downward movement in response to force by the stream of drilling fluid, means to move the plunger upward when it is not subjected to the force of the stream of drilling fluid, and a gravity-responsive deviation-detector to limit the upward movement of the plunger in accord with the degree of deviation of the well bore from vertical, said housing being filled with a liquid and having a movable wall to permit displacement flow of the liquid in the housing in response to movement of the plunger whereby the combined volume of the housing and the exposed portion of the plunger is constant, the combination therewith of means to prevent initiation of the downward movement of the plunger for a substantial period of time after flow of the downward stream of drilling fluid is initiated thereby to provide a time interval for stabilization of the downward stream before the plunger generates the signals.

19. A combination as set forth in claim 18 which includes: a by-pass in parallel with said delay means; and a spring-loaded relief valve normally closing said by-pass and yieldingly opposing the displacement flow caused by downward movement of the plunger, said relief valve yielding to a predetermined high fluid pressure to keep the pressure of the liquid in the housing from rising to a destructive magnitude when the force of the stream of drilling fluid on the plunger rises excessively.

20. In a signalling drift indicator for use in a downward stream of drilling fluid in a drill string in a well bore wherein the indicator has a housing for positioning in the drill string longitudinally thereof, a plunger protruding longitudinally from the housing to generate a series of signals in response to downward movement of the plunger by the force of the stream of drilling fluid, means to move the plunger upward from a normal position when it is not subjected to the force of the stream of drilling fluid, and a gravity-responsive deviation-detector to limit the upward movement of the plunger in accord with the degree of deviation of the well bore from vertical, said housing being filled with a liquid and having a movable wall to permit displacement flow of the liquid in the housing in response to movement of the plunger whereby the combined volume of the housing and the protruding portion of the plunger is constant, the combination therewith of: means to retard the displacement flow of the liquid in the housing when the flow of the stream of drilling fluid is initiated thereby to retard the downward movement of the plunger; a by-pass in parallel with said retarding means; and a spring-loaded relief valve normally closing said by-pass and yieldingly opposing the displacement flow caused by downward movement of the plunger, said relief valve yielding to a predetermined relatively high fluid pressure to keep the pressure of the liquid in the housing from rising to a destructive magnitude when the force of the stream of drilling fluid on the plunger rises excessively.

21. In a signalling drift indicator for use in a downward stream of drilling fluid in a drill string in a well bore wherein the drift indicator has a housing for positioning in the drill string longitudinally thereof, a plunger protruding longitudinally from the housing to generate a series of spaced signals by downward movement in response to force by the stream of drilling fluid, and means to move the plunger upward when the plunger is not subjected to the force of the stream of drilling fluid, the combination therewith of: a pendulum in said housing structurally separate from said plunger; a lift spring urging said pendulum upward against the plunger to cause the pendulum to follow the upward movement of the plunger; a series of stops to limit the upward movement of the pendulum in accord with the inclination of said housing from vertical, the range of effectiveness of said stops being substantially shorter than the maximum range of extension of the plunger whereby the pendulum follows only a small initial portion of the upward movement of the plunger; and means controlled by the relatively short movements of the pendulum to stop the upward movement of the plunger selectively over the longer maximum range of the plunger in accord with the stopped positions of the pendulum.

22. A combination as set forth in claim 21 which includes means to lock the pendulum in its stopped position in response to the upward movement of the plunger beyond said initial portion of its upward movement.

23. A plunger assembly for use in a drift indicator in a downward stream of drilling fluid in a drill string in a well bore, wherein the drift indicator has a housing for positioning in the drill string longitudinally thereof, said plunger assembly protrudes longitudinally from the housing for extension and retraction relative thereto to generate a series of signals by downward movement in response to force by the stream of drilling fluid, means to urge the plunger assembly upward when said force is not effective, and means to limit the upward movement of the plunger assembly in accordance with the inclination of the housing from vertical thereby to control the signals, said plunger assembly comprising: a first section controlled by said limiting means; a second section protruding from the housing to generate signals; and yielding means to normally hold the two sections together and to yield in response to a separation force of a predetermined magnitude for separation of the two sections in response to an excessive upward load on the second section to prevent transmission of the excessive load to said limiting means.

24. A plunger assembly as set forth in claim 23 in which said holding means is a detent connection between the two sections of the plunger assembly.

25. A plunger assembly as set forth in claim 23 in which said holding means comprises a spring acting between said housing and said second section to urge the second section against the first section in opposition to said means that urges the plunger assembly upward.

26. A plunger assembly as set forth in claim 25 which includes means movable with the second section to engage said housing to immobilize the second section, said immobilizing means being responsive to relatively slight separation of the two sections thereby to limit the distance of separation between the two sections.

27. A combination as set forth in claim 19 in which said preventing means includes means responsive to the pressure of the drilling fluid to prevent displacement of the liquid in the housing when the pressure of the drilling fluid is relatively low and to permit such displacement when the pressure of the drilling fluid is relatively high thereby to prevent initiation of the downward movement of the plunger during the initial rise of the pressure of the drilling fluid when the initial flow of the drilling fluid is unstable and to permit downward movement of the plunger and the consequent generation of signals when the pressure of the drilling fluid rises relatively high after the flow of the drilling fluid is stabilized.

References Cited in the file of this patent
UNITED STATES PATENTS

| | | |
|---|---|---|
| 2,329,732 | Varney | Sept. 21, 1943 |
| 2,435,934 | Varney | Feb. 10, 1948 |
| 2,762,132 | Varney | Sept. 11, 1956 |
| 2,824,380 | Nelson | Feb. 25, 1958 |